United States Patent [19]
Adachi

[11] 4,334,263
[45] Jun. 8, 1982

[54] SEPARATELY EXCITED DC-DC CONVERTER HAVING FEEDBACK CIRCUIT WITH TEMPERATURE COMPENSATING EFFECT

[75] Inventor: Hiroo Adachi, Kawagoe, Japan

[73] Assignee: Pioneer Electronic Corporation, Tokyo, Japan

[21] Appl. No.: 129,207

[22] Filed: Mar. 11, 1980

[30] Foreign Application Priority Data

Mar. 13, 1979 [JP] Japan .............................. 54-32262[U]

[51] Int. Cl.³ .......................................... H02P 13/22
[52] U.S. Cl. ...................................................... 363/25
[58] Field of Search ...................................... 363/15–17, 363/21, 23, 25, 28–31, 97, 98; 323/266, 294

[56] References Cited

U.S. PATENT DOCUMENTS

| | | | |
|---|---|---|---|
| 2,987,664 | 6/1961 | Poirier et al. | 363/25 |
| 3,117,270 | 6/1964 | Tailleur | 363/23 |
| 3,327,199 | 6/1967 | Gardner et al. | 363/23 |
| 3,401,327 | 9/1968 | Leppert | 363/25 |
| 3,408,559 | 10/1968 | Bambace et al. | 323/266 |
| 3,940,683 | 2/1976 | Blauschild | 323/22 T |
| 3,956,661 | 5/1976 | Sakamoto et al. | 323/22 T |
| 4,150,423 | 4/1979 | Boschert | 363/21 |

FOREIGN PATENT DOCUMENTS

| | | | |
|---|---|---|---|
| 1166908 | 4/1964 | Fed. Rep. of Germany | 363/25 |
| 515100 | 9/1976 | U.S.S.R. | 363/25 |
| 197712 | 12/1977 | U.S.S.R. | 363/97 |

*Primary Examiner*—William H. Beha, Jr.
*Attorney, Agent, or Firm*—Michael J. Striker

[57] ABSTRACT

A separately-excited DC-DC converter having a feed-back loop for providing stable operation notwithstanding changes of load. The feed-back loop may include a temperature-responsive element so as to provide stable operation even under changes of the ambient temperature.

4 Claims, 2 Drawing Figures

# SEPARATELY EXCITED DC-DC CONVERTER HAVING FEEDBACK CIRCUIT WITH TEMPERATURE COMPENSATING EFFECT

FIELD OF THE INVENTION

The present invention relates to a DC-DC converter and particularly to a separately-excited DC-DC converter.

BACKGROUND OF THE INVENTION

A separately-excited DC-DC converter is a device for converting an input DC voltage into an output DC voltage with a magnitude different from the input DC voltage, in response to a drive pulse signal having a predetermined repetition frequency.

Various types of separately-excited DC-DC converters have been developed, one type of which includes a switching circuit from periodically interrupting the input DC voltage in response to the drive pulse signal. The interrupted DC voltage is supplied to a transformer which raises or reduces the voltage of the input DC voltage. The thus transformed voltage is further transformed, if desired, and then rectified by a rectifier which is preferably a full-wave rectifier. The rectified voltage is smoothed by a smoothing circuit into the DC output voltage.

Such DC-DC converter as mentioned above is advantageous in that the repetition frequency of the interruption therein can be relatively freely changed by selecting the repetion frequency of the drive pulse signal. However, it has been a problem that an undesirably large intensity of a primary current flows in the transformer at no-load or light load conditions, thereby causing large loss of electric power.

Accordingly, it is a primary object of the present invention is to provide an improved separately-excited DC-DC converter which is free from such problem as mentioned above and having a less magnitude of loss of power under a no-load or light load condition.

It is another object of the present invention to provide a separately-excited DC-DC converter which can stably operate notwithstanding fluctuation of load.

It is a further object of the present invention to provide a separately-excited DC-DC converter which can stably operate even under large variation of the ambient temperature.

Other and more particular objects and advantages will be apparent from the following description taken in conjunction with the appended drawings wherein like reference numerals refer to like parts.

DESCRIPTION OF THE EMBODIMENTS

Figure 1:
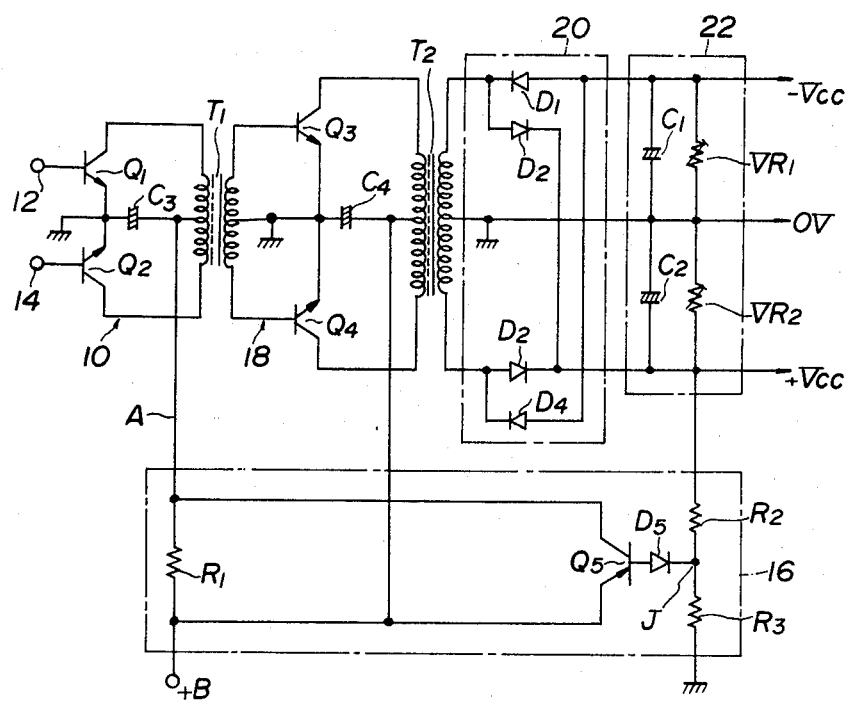
FIG. 1 is a circuit diagram showing an embodiment according to the present invention.

Referring to FIG. 1, there is shown a separately excited DC-DC converter according to the present invention which comprises a switching circuit 10 including a pair of transistors $Q_1$ and $Q_2$ of PNP and NPN types respectively having the emitters thereof connected with each other and grounded in this case. The bases of the transistors $Q_1$ and $Q_2$ are connected to input terminals 12 and 14 to which drive pulse signals are to be supplied which are preferably rectangular pulse signals and inverted in phase from each other and each having a pre-selected repetion frequency and are supplied from a suitable pulse generator (not shown). The collectors of the transistors $Q_1$ and $Q_2$ are connected to end terminals of a primary coil of a transformer $T_1$ respectively. The transformer $T_1$ has a center tap which is connected through a capacitor $C_3$ to the emitters of the transistors $Q_1$ and $Q_2$. To the center tap of the transformer $T_1$ is applied a DC voltage appearing on a line A which is connected to a voltage source $+B$ generating a first DC voltage through a resistor $R_1$ forming a part of a feedback circuit 16. The capacitor $C_3$ is effective for reducing ripple components contained in the first DC voltage. End terminals of a secondary coil of the transformer $T_1$ are respectively connected to the bases of transistors $Q_3$ and $Q_4$ which constitute an additional switching circuit 18. The bases of the transistors $Q_3$ and $Q_4$ are connected with each other and grounded in this case. The collectors of the transistors $Q_3$ and $Q_4$ are respectively connected to end terminals of a primary coil of an additional transformer $T_2$. A center tap of the primary coil of the transformer $T_2$ is connected to the emitters of the transistors $Q_3$ and $Q_4$ through a capacitor $C_4$. On the center tap of the transformer $T_2$ is exerted the first DC voltage from the power source $+B$. The switching circuits 10 and 18, and the transformers $T_1$ and $T_2$ constitute a converting circuit which converts the first DC voltage into an AC signal having a frequency corresponding to the repetition frequency of the drive pulse signal applied to the input terminals 12 and 14. The switching circuit 18 and the transformer $T_2$ may be omitted if desired and otherwise still additional switching circuits and transformers may be connected to the succeeding stage of the switching circuit 18 and the transformer $T_2$.

End terminals of the transformer $T_2$, that is, output terminals of the converting circuit, are respectively connected to input terminals of a rectifying circuit 20 which includes diode $D_1$, $D_2$, $D_3$, and $D_4$ constituting a full-wave rectifier. The output terminals of the rectifying circuit 20 are respectively connected to input terminals of a smoothing circuit 22 which includes variable resistors $VR_1$ and $VR_2$, and capacitors $C_1$ and $C_2$ respectively connected in parallel with the resistors $VR_1$ and $VR_2$. Output terminals of the DC-DC converter of the present invention and produce thereon second DC voltages $-Vcc$ and $+Vcc$, respectively.

To either one of the output terminals of the smoothing circuit 22 is connected one terminal of a voltage divider consituted by resistors $R_2$ and $R_3$ serially connected with each other at a joint J. The other terminal of the voltage divider is grounded. The joint J is connected through a diode $D_5$ to the base of a transistor $Q_5$ having the collector and emitter thereof connected to both ends of the resistor $R_1$. The resistor $R_1$ and the transistor $Q_5$ cooperate with each other so as to constitute a variable resistance means. The diode $D_5$ is effective for preventing a reverse voltage appearing across the joint J and emitter of the transistor $Q_5$ to destroy the transistor $Q_5$. The transistor $Q_5$ may be substituted for another electronic element operating as a variable conductive element, if preferred. The resistances of the resistors $R_2$ and $R_3$ are selected so as to make the transistor $Q_5$ non-conductive when the voltage $+Vcc$ exceeds a predetermined voltage. The feed-back circuit 16 is constituted by the voltage divider of the resistors $R_2$ and $R_3$, and variable resistance circuit including the transistor $Q_5$, the diode $D_5$ and the resistor $R_1$.

When, in operation, the drive pulse signals having phases inverted from each other are respectively applied to the input terminals 12 and 14, the transistors $Q_1$ and $Q_2$ are made conductive alternately so that the DC voltage on the line A is periodically interrupted thereby causing an AC voltage to appear across the both end terminals of the secondary coil of the transformer $T_1$. The AC voltage from the transformer $T_1$ causes the switching circuit 18 to interrupt the DC voltage from the power source +B with the result that an AC voltage appears on the end terminals of the transformer $T_2$. The AC voltage from the transformer $T_2$ is rectified by the rectifying circuit 20 and thereafter smoothed by the smoothing circuit 22. The output voltages +Vcc and −Vcc of the smoothing circuit 22 are to be supplied as constant DC voltages to various circuit arrangement (not shown).

When, in operation, magnitudes of the load become larger or smaller the potential at the joint J rises or lowers thereby causing the resistance of the variable resistance means consituted by the resistor $R_1$ and the transistor $Q_5$ becomes larger or smaller, whereby the first DC voltage is modified in reversely proportionate to the output voltage +Vcc. Especially, an unwanted over-current in the switching circuits 10 and 18 can be suppressed even under a non-load or light load condition.

Since, on the other hand, various temperature-responsive electronic devices including PN junction, such as, transistors $Q_3$, $Q_4$, $Q_5$ and diodes $D_5$ are employed in the feed-back loop in the circuit arrangement of FIG. 1, the transformer $T_1$ is subject to over-drive condition due to increase of the exciting current of the transformer $T_1$ because the temperature responsiveness of the electronic devices result in positive feed-back in the feed-back loop. In such condition, the input rectangular drive pulse signal is distorted in its wave form thereby causing not only loss of power in the transformer but also noise problem in the reproduction of LW and MW signal when a tuner is connected to this converter because of the higher harmonic components in the distorted drive pulse signal. When the ambient temperature decrease such positive feedback caused by the temperature responsiveness of the electronic devices further results in shortage of exciting current of the transformer $T_1$ which causes instability in operation of the switching circuit 10.

Figure 2:
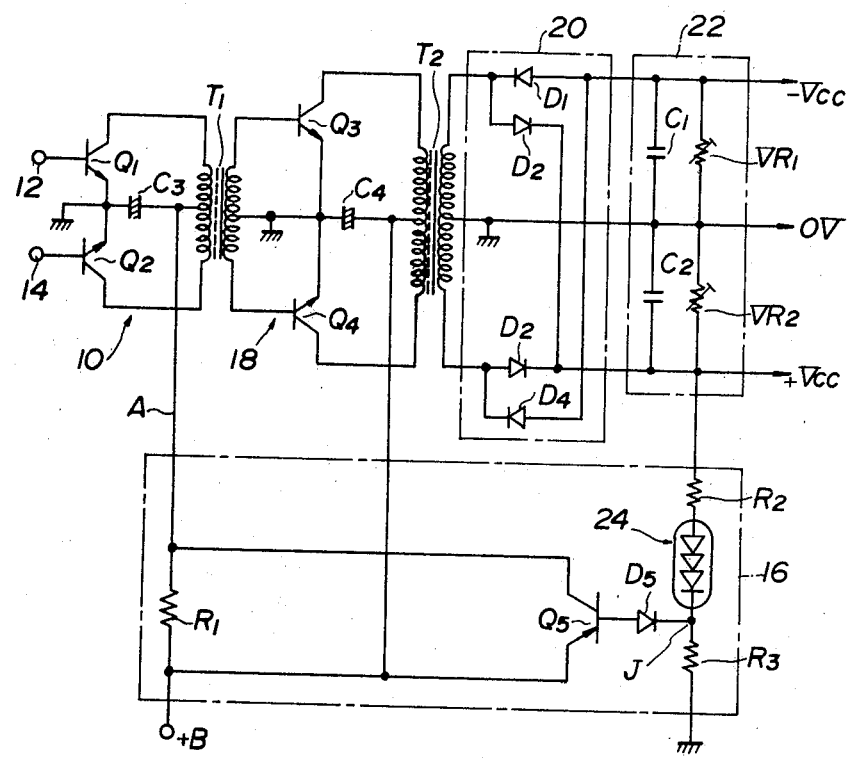
FIG. 2 is a circuit diagram showing another embodiment of the present invention.

In order to solve the above-mentioned problem, another embodiment has been conceived by the Applicant which is shown in FIG. 2.

An circuit arrangement according to the present invention of FIG. 2 is identically the same as that of FIG. 1 except that the feed-back circuit 16 contains a temperature-responsive element 24 provided between the resistors $R_2$ and $R_3$. The temperature-responsive element 24 includes three diodes serially connected with each other in this embodiment so as to compensate changes in characteristics of the transistors $Q_4$ and $Q_5$ and diode $D_5$. The temperature-responsive element 24 may be substituted for another temperature-responsive element such as thermistor and varistor, if preferred. When the diode $D_5$ is omitted, the number of the PN junctions in the temperature-responsive element 24 is to be reduced to two.

It is to be noted that the temperature-responsive element 24 may be substituted for another temperature-responsive element which is serially connected with the diode $D_5$. It is essential that the feed-back circuit 16 must compensate the change in the circuit characteristics in the feed-back loop due to change of ambient temperature.

It should be understood that even though the DC-DC converter mentioned above is a balanced type for producing two different output DC voltages +Vcc and −Vcc, the DC-DC converter may include only one circuit system or line for producing either one of the voltages +Vcc and −Vcc, if desired.

Being apparent from the above description, a separately-excited DC-DC converter according to the present invention can be applied to many devices such as a power source for an audio equipment installed on an automobile.

While the invention has been described in connection with certain specific embodiments, it should be understood that the description is set forth merely as an example, and that various modification will be obvious to those skilled in the art. Therefore, the scope of the invention be construed as broadly as the prior art will permit.

What is claimed is:

1. A separately excited DC-DC converter, comprising voltage supply means for providing a first DC voltage; inverter means for converting said first DC voltage into an AC voltage in response to a drive pulse signal of a predetermined repetition frequency, said inverter means including at least one transformer for amplifying said AC voltage; rectifier means for rectifying the amplified AC voltage; a smoothing circuit for smoothing the rectified AC voltage into a second DC voltage which is higher than said first DC voltage; and feed-back means for modifying said first DC voltage in accordance with said second DC voltage, said feed-back means including a voltage divider connected to said smoothing circuit for dividing said second DC voltage, the dividing ratio of said voltage divider varying in response to the ambient temperature, and variable resistance means inserted between said voltage supply means and said inverter means and including at least one resistor inserted between said voltage supply means and said inverter means, and a variable conductive element connected in parallel with said resistor and having conductivity varying in accordance with the divided voltage.

2. The separately excited DC-DC converter as defined in claim 1, in which said voltage divider includes a pair of resistors, and a temperature-responsive element interconnected between said resistors.

3. The separately excited DC-DC converter as defined in claim 2, in which said temperature-responsive element includes at least one diode.

4. The separately excited DC-DC converter as defined in claim 1, in which said variable conductive element includes a transistor having the emitter and collector thereof connected to the both terminals of said at least one resistor and the base thereof connected to said voltage divider.

* * * * *